United States Patent [19]
Ferguson

[11] Patent Number: 5,464,234
[45] Date of Patent: Nov. 7, 1995

[54] REARWARD APPROACH CURB JUMPER FOR A HAND TRUCK

[76] Inventor: Alan C. Ferguson, 1482 Sky Harbor Dr., Ste. G, Marysville, Calif. 95901

[21] Appl. No.: 207,086

[22] Filed: Mar. 8, 1994

[51] Int. Cl.⁶ ..................................................... B62B 5/02
[52] U.S. Cl. ........................ 280/5.32; 280/47.12; 280/47.2
[58] Field of Search .................................... 280/5.32, 5.2, 280/47.12, 47.2

[56] References Cited

U.S. PATENT DOCUMENTS

| | | | |
|---|---|---|---|
| 217,864 | 7/1879 | Dolan | 280/5.32 |
| 269,248 | 12/1882 | Wetmore | 280/5.32 |
| 275,386 | 4/1883 | Hughes | 280/5.32 |
| 814,874 | 3/1906 | Rowe | 280/5.32 |
| 876,753 | 1/1908 | Wanee | 280/5.32 |
| 1,201,957 | 10/1916 | Hall | 280/47.12 |
| 1,334,726 | 3/1920 | White | 280/5.32 |
| 1,341,171 | 5/1920 | Hall | 280/47.12 |
| 1,501,242 | 7/1924 | Sabin | 280/47.2 |
| 2,243,915 | 6/1941 | Mueller | 280/47.2 |
| 2,417,553 | 3/1947 | Jensen | 280/47.12 |
| 2,689,792 | 9/1954 | Gemeinhardt | 280/5.32 |
| 3,175,835 | 3/1965 | Garrison | 280/5.32 |
| 3,788,413 | 1/1974 | Miller | 280/5.32 X |
| 4,630,837 | 12/1986 | Kazmark | 280/47.2 |

FOREIGN PATENT DOCUMENTS

| | | | |
|---|---|---|---|
| 0006423 | 3/1898 | United Kingdom | 280/5.32 |
| 1098777 | 1/1968 | United Kingdom | 280/5.32 |
| 8807951 | 10/1988 | WIPO | 280/47.12 |

Primary Examiner—Kenneth R. Rice
Assistant Examiner—F. Zeender

[57] ABSTRACT

A fulcrum and method of use for passage of a hand truck rearward, handles first, over a curb and onto an adjacent raised surface such as a sidewalk. A short pivotable arm attached to rails of the truck is the fulcrum, and is positioned low on the rearward side of the truck to render high leverage. The arm is connected to stop members which limit outward movement of the arm to about a perpendicular angle to the rails. A latch maintains the arm initially outward for the curb climbing process. In use, the truck is first positioned with its rear side facing the curb, the arm in the outward latched position, and with the truck wheels on the lower surface adjacent the curb, and the truck cargo platform facing outward away from the curb. The truck rails are then manually pulled rearward and downward in an arch over the sidewalk to engage the distal end of the arm against the top of the curb. Continued pulling on the handles causes the wheels and cargo platform to raise above the top of the curb as the truck is pivoted on the arm. After the wheels are raised above the curb, and with continued downward rail movement and resultant angular change, the latch automatically disengages, the arm pivots toward a stored position of the distal end adjacent the cargo platform, resulting in movement of the truck horizontally as the wheels are lowered to the sidewalk.

2 Claims, 9 Drawing Sheets

REARWARD APPROACH CURB JUMPER FOR A HAND TRUCK

BACKGROUND OF THE INVENTION

1. Field of the Invention

This invention relates to manually operated upright hand trucks with pivotally attached fulcrums and methods of use thereof to assist in getting the truck up a curb and onto a higher adjacent surface such as a sidewalk. More particularly, the present invention is a fulcrum providing arrangement on a hand truck, and a method of use thereof to allow the truck to be easily levered over the curb and onto the sidewalk with the truck handles being first to move over the curb.

2. Description of the Prior Art

This disclosure is teaching an invention applicable to the prior art type of manually operable hand truck which normally includes two rotatable wheels at the bottom end, the wheels being in spaced relationship and on oppositely disposed sides of a cargo platform also at the lower end, and with a wheel axle support extending between the two wheels, the axle being positioned just behind and slightly higher than the cargo platform. The cargo platform is located between the two wheels, and is generally horizontally disposed and resting on the ground when the truck is in the full upright or vertical non-moving or resting position. The cargo platform extends outward from the front of the truck, and the vertical center axis of the wheels is positioned sufficiently rearward of the cargo platform so that the wheels do not enter the cargo carrying area. Securely attached to the rearward portion of the cargo platform, and adjacent the wheel axle, are two vertically rising elongated side rails, normally between about 4 and 5 feet in length, which are in spaced relationship and normally parallel to one another. The rails extend upward generally perpendicularly to the cargo platform, and include hand grip areas or handles at the upper ends. The two rails are normally tied together with one or more transverse cross members for added strength and rigidity. The rails function to provide a back rest against which cargo on the cargo platform may lean or be tied, and additionally, the elongated rails serve as levers by which the single human operator of such a truck may tilt the cargo platform rearward at an angle, by pulling back on the rails, initially with one foot against the axle to brake the truck, to tilt the truck rearward, and to achieve balance of the load directly over the vertical center of the wheels to render the wheels as the only surface contacting portion of the hand truck. The operator may then maintain the weight balance using the leverage gained by the extended rails as he pushes, cargo platform first, the truck to his destination, with the truck tilted rearward with the hand grip areas normally positioned slightly above the waist height of the operator, and the rails tilted at about 35 to 45 degrees. The hereinabove described hand truck will henceforth be referred to as an "upright" type hand truck, since it is vertically upright when stationary, and tilted, but not horizontal when propelled along a surface by an operator. A few "upright" hand trucks include an additional set of spaced apart rotatably affixed wheels mounted upward toward the grip portion of the rails of the truck, with these two additional wheels serving to allow this particular truck design to also be used in a horizontally disposed position with four wheels contacting the ground at once when desired, however this type of four wheel truck is also designed for and is very usable in the "upright" position as described above, and therefore the present invention applies to both the two wheeled and four wheeled hand trucks of the "upright" nature.

Manually operated upright hand trucks for transporting cargo by a single operator have been used for many years to transport heavy or bulky loads such as refrigerators, heavy boxes and the like. One disadvantage with the use of such upright hand trucks is that heavily loaded trucks are not easily maneuvered up and over raised curbs and onto adjacent sidewalks. Typically, in attempting to maneuver a hand truck up over a curb, the operator generally ends up strenuously pulling the loaded truck up the edge of the curb, which can all too often result in injury to the operator's back or other body parts. Such awkward strenuous maneuvers can also lead to the displacement of the load.

To the best of my knowledge, all upright hand trucks presently in use are structured in a manner essentially requiring significant force and pulling or lifting to be applied by the operator in order to drag the truck up and over a curb, and this is leading to excessive numbers of back injuries and related insurance claims, not to mention increased fatigue and production slow downs.

Some prior art devices have attempted to address the problem of getting a hand truck up and over a curb or curb like obstacle by way of utilizing a pivotally attached fulcrum intermediate of the wheels and handles of the truck, yet, to the best of my knowledge, none are currently on the market for sale or in use. Some of these prior art devices are specifically structured for and described for use in getting the truck up stairs, while others are for the purpose of moving the truck up a curb onto an adjacent higher surface, such as a sidewalk for example.

The prior art devices of which I am aware, and feel are somewhat relevant to my invention are taught in U.S. Pat. No. 876,753 issued Jan. 14, 1908 to W. Wanee for "hand truck"; U.S. Pat. No. 1,334,726 issued Mar. 23, 1920 to P. M. White for "stair climbing hand truck"; U.S. Pat. No. 314,874 issued Mar. 13, 1908 to D. H. Rowe for "truck"; U.S. Pat. No. 217,864 issued Jul. 29, 1879 to T. Dolan for "wheelbarrow"; U.S. Pat. No. 3,175,835 issued Mar. 30, 1965 to P. J. Garrison for "dollie curb jumper"; U.S. Pat. No. 275,386 issued Apr. 10, 1883 to W. W. Hughes for "hand truck"; and U.S. Pat. No. 269,248 issued Dec. 1882 to J. W. Wetmore for a "stairway truck".

All of the above prior art devices involve the application of at least one pivotally attached extension downward below the rails for the purpose of serving as a fulcrum in conjunction with the rails for allowing leverage and the lifting of the cargo platform and adjacent wheels off of the ground temporarily, so as to be able to position the wheels upward onto an adjacent higher surface. Typical of all of these devices is that the fulcrum extension is pivotally attached to the rails so as to be able to change angle during use, with some of the devices having limits to the pivotal movement of the fulcrum while others do not. Also typical of many of these prior art devices is the use of a biasing arrangement, normally a spring to serve as a way of returning, automatically or semi-automatically the fulcrum extension to a given position after having pivoted to a second position during use. Another common feature of many of these prior art devices is the use of an extending rod or member secured to the pivotally mounted fulcrum at one end, with the opposite end of the extending member located up near the grip areas of the rails so as to allow the operator to pull or push the fulcrum into a given position while still being able to control the rails and thus truck during operation.

Another, and the most significant commonality of the prior art devices is the method of approaching the curb with the hand truck or truck-like device "wheels first", with the handle end of the rails positioned extending away or outward from the curb, and the fulcrum being placed on the lower surface for use in raising the wheels to the higher surface. As previously stated, I am not aware of any upright hand trucks for sale or in use anywhere at this time which utilize an affixed pivotal fulcrum to aid in moving the truck up a curb and onto a sidewalk or like raised surface, and I believe this situation to be due to the related prior art devices all being structured and geometrically arranged for the "wheels first" method of approach to the curb, as compared to the handles first approach of the present invention.

As exemplified in the Garrison and Wanee patents, the principles of the wheels first approach are that the truck is entirely on the lower surface, positioned with the wheels adjacent the curb, and the rails and handles extending outward away from the curb. The pivotal fulcrum is initially leaning toward the wheels as in Wanee, or vertical as in Garrison, and the distal end of the fulcrum is also on the lower surface below the raised surface. Then the operator pushes downward on the handles to pivot the truck about the pivots of the fulcrum in order to raise the wheels upward above the curb, at which time the operator pushes forward or allows forward movement (stops pulling rearward) on the handle to move the truck body forward, to cause or allow the distal end of the fulcrum to lean toward the handles, and for the front of the truck and wheels to move forward over the upper surface of the curb, followed by the operator raising the rails or continuing to push forward to lower the wheels onto the sidewalk or raised surface. With the wheels first approach, it can easily be envisioned that with common loads in the range of 150 or more pounds, the operator would have a difficult time in controlling the load balance simultaneously with the forward pushing or rearward pulling requirements, depending upon the starting position of the fulcrum and load weight distribution. If the process began with the fulcrum leaning toward the wheels as with Wanee, then horizontal pushing on the handles is required once the wheels are raised, wherein essentially the entire load (weight) of the truck and cargo is raised via tilting the fulcrum to more vertical without the assistance of gain provided by a lever to force the fulcrum up and over the top of its pivotal arc, or in other words, from leaning one direction to vertical, a more raised position, in order to pivot the fulcrum in the opposite direction and propel the truck forward over the top of the raised surface. If, the wheels first approach is started with the pivotal fulcrum vertical (90 degrees to the ground surface) as in the Garrison patent, then pulling rearward upon the handles while pushing down may be required of the operator, since, upon lifting the truck on the vertical fulcrum wherein the rails are tilted downward toward the ground at the lower wheel and cargo platform end, the Garrison truck will have a undesirable tendency to move forward. Depending upon the amount of weight and weight distribution on the truck, the operator may or may not be able to hold the Garrison truck from moving forward on the pivotal fulcrum toward the curb, and this problem will be particularly evident with heavy loading wherein most of the total weight is near the cargo platform, as opposed to being further up on the rails. With a heavy load, the Garrison truck may move forward wherein the cargo platform may abut the curb, rendering further vertical lifting difficult, since the cargo platform is the forward most portion of the truck, as is common with modern upright hand trucks.

So there is a significant need for improvement in getting a heavily loaded upright hand truck up a curb and onto an adjacent raised surface such as a sidewalk.

Furthermore, there are currently millions of upright hand trucks in use in the United States and around the world without any type of pivotal fulcrum thereon to assist in getting the truck over a curb, and since these trucks are relatively expensive, few owners thereof wish to dispose of their otherwise perfectly good hand trucks because of the problem of getting them up and over a curb, particularly when there are no feasible alternatives available on the market. Additionally, it should be noted that all of these hereinabove mentioned prior art devices appear reliant upon specifically located bolt holes, specifically placed notches and the like in the structural frame members, namely through the rails to allow the attachment of the fulcrum extensions, return springs and pull or push rods. Existing trucks are all structurally engineered and manufactured of materials of the desired known strengths and thicknesses to meet the designed load capacity of such trucks, and do not commonly have any holes in the rails which could be used to bolt on a pivotal fulcrum. To drill (cut) holes in the engineered structural members, particularly the rails which serve as levers and thereby are exposed to heavy loading, would tamper with the engineered structural integrity of the truck, possibly causing a structural member to fail under heavy loading which would be inconvenient in the very least, if not injurious to the operator or others near the truck at the time of the failure. Furthermore, there are many manufacturers of such upright hand trucks absent curb jumping fulcrums, and this has resulted in many slightly varying spacings between rails, and in location of reinforcement bracing normally placed from the lower portion of the rails downward to the wheel axle and to the rearward edge of the cargo platform to strengthen and tie these components together. In other words, there are no rigid standardizations of upright hand truck structures of this nature, although upright hand trucks made by numerous different companies all have substantial similarities to one another, since they operate on the same principles.

Therefore, there is a significant need for an improved structure and method for use on hand trucks for getting the truck up a curb and onto an adjacent raised surface such as a sidewalk, and such improvement would be ideal if it were applicable to upright hand trucks being currently manufactured, and also applicable to the millions of existing upright hand trucks.

SUMMARY OF THE INVENTION

The present invention is a fulcrum providing arrangement and method of use thereof for an upright hand truck which is to allow the truck to be levered rearward from a lower surface upward onto a raised surface, such as over a curb and onto an adjacent sidewalk, with the truck handles first, as opposed to the wheels first approach of the prior art. The structure, geometry and method of the invention is particularized to upright hand trucks of the type hereinabove described at the beginning of the Description of the Prior Art, and to a curb height range between about three and nine inches, with most curbs being between 6 to 7 inches in height upward from the bottom of the curb. The invention could be arranged to function with curbs higher than 9 inches, but in this disclosure, the invention will be described by way of example in relationship to a 9 inch maximum height curb example, since normally this will be the highest curb expected to be encountered, and a curb of around 9 inches will only be rarely encountered since most cities and townships have building codes requiring new curbs to be installed between the 6 and 7 inch height.

The invention includes a pivotal extending fulcrum, henceforth designated the swing arm or arm, which is affixed to and between the truck rails, and unlike the prior art, during use thereof, the distal end of the swing arm is engaged against the top of the curb with the truck in a vertical yet slightly tilted orientation, and with the truck wheels on the lower surface adjacent the vertical face of the curb. Initially, the cargo platform faces outward away from the curb, and the rear of the truck faces the curb during the curb jumping process. The swing arm includes a readily releasable latch to maintain the arm outward and somewhat perpendicular to the rails just prior to use of the swing arm. Also attached to the swing arm is an outward-pivot stop to limit the outward swing of the swing arm away from the wheels during the initial curb jumping procedure. The limiting of the pivotal movement of the swing arm to around or about perpendicular to the rails, so that the swing arm cannot pivot beyond a predetermined point toward the handle end of the rails allows the swing arm to be pried against during the initial raising process wherein the swing arm is lying at an angle and the rails are being pulled in a direction which without the limit stops would simply fold or pivot the swing arm and rails toward one another rendering it essentially impossible for the swing arm to serve as a fulcrum to raise the wheels of the truck.

A flexible lanyard or the like is preferably connected between the swing arm and the upper end of the rails to allow convenient pulling of the swing arm from a stored position into the outward latched position prior to use, and due to the substantially low mounting position of the swing arm on the truck, the swing arm is raised and latched in the outward position just prior to the truck being positioned adjacent the curb in order to eliminate the distal end of the swing arm from abutting the vertical face of the curb during the raising of the arm.

With the present invention, the truck is backed up and placed with the wheels on the lower surface adjacent the curb, and the cargo platform extending away from the curb. The swing arm needs to have been raised and latched upward prior to the truck being positioned too close to the vertical face of the curb. Then the rails are pulled rearward and downward in an arched swing over the sidewalk by the operator, causing the swing arm to abut the top of the curb, and then with further pulling of the rails causing the wheels and cargo platform to raise above the top of the curb as the truck is pivoted on the extended swing arm serving as the fulcrum. Partially through the curb jumping procedure, after the wheels are raised above the curb, the low friction latch automatically disengages or is over ridden by way of the weight (pressure) of the cargo being repositioned relative to the swing arm (fulcrum) due to the further downward movement and thus angular changes in the rails as the result of the operator continuing to pull downward on the handles of the rails. As the weight is redistributed relative to the swing arm, the swing arm begins pivoting toward a stored position adjacent the wheel axle, under the redistributing weight, which has the result of moving the truck horizontally further over the raised surface as the wheels are gently lowered to rest on the sidewalk or raised surface. The operator is essentially required to only pull rearward and then mostly downward on the handles, which is essentially one sweeping motion, and the angular changes in the rails cause a redistribution of the weight relative to the swing arm, the degree of which is dependant upon the particular load on the cargo platform, which has the effect of causing the load itself to begin working for the operator in completing the forward horizontal movement of the truck further over the raised surface as the swing arm pivots toward the wheels and lowers the wheels onto the raised surface. Once the wheels are above the top of the curb, in order to expedite the pivoting of the swing arm toward the stored position and eliminate the need for further downward movement of the rails, the operator may, if he chooses, and the weight of the load permits, pull horizontally on the handle to give impetus to the pivoting of the swing arm into the stored position. In either situation, the operator easily controls the lowering of the truck wheels onto the raised surface via his control over continued downward movement of the rails and the resultant angular changes and weight redistribution between the pivotal swing arm and the truck rails, or via his pulling horizontally once the wheels are sufficiently raised to cause pivoting of or give impetus to the swing arm and the lowering of the wheels onto the raised surface. The operator is essentially required to make one simple operation once the tilting of the truck over the curb begins, and this requires little effort due to the high leverage arrangement afforded by the swing arm being mounted relatively near the bottom end of the truck and a substantial distance from the handle end of the rails.

It should be noted that the pivotal swing arm is in effect extended by the raised curb on which the swing arm is engaged during the curb jumping process. The use of the top of the curb as a further downward extension of the swing arm (fulcrum) has the very desired effect of allowing the swing arm to be attached quite low to the bottom of the truck, preferably at about the top of the wheels which are normally around 10 inches in diameter, and a substantial distance from the handles of the rails, so as to leave a very effective length of the rails on the far side of the swing arm to provide very high leverage capacity. Furthermore, even though the swing arm is mounted substantially toward the bottom end of the truck, through the use of the curb as a further effective extension of the swing arm, the swing arm may be made or kept properly short to allow it to be stored in a downward position between the wheels without the distal end of the swing arm striking the ground or extending beyond the wheel radius during normal tilted use of the truck.

Additionally, the swing arm cannot slide away from the curb edge during the initial lift since the only direction it could slide, due to its initial steep angular approach to the curb, is toward the sidewalk or operator, and this would be prevented since the wheels would abut the vertical face of the curb and thus prevent such sliding movement of the swing arm on the curb until such time the swing arm became sufficiently vertically oriented as to no longer be significantly disposed to sliding in any direction.

The present invention eliminates much of the work required of the operator to move a hand truck over a curb, by providing high leverage via attaching the swing arm relatively close to the truck wheels, thus rendering relatively long levers, i.e. rails between the fulcrum and handles, and further by providing the operator an arrangement which is easy to control with few if any possibilities of significant operator error which could lead to failure in the lifting process.

Furthermore, the invention may take a structural embodiment of an add-on or readily attachable curb jumper for attachment to existing in use hand trucks, or alternatively, a structural embodiment as an integral feature of the hand truck when the hand truck is originally manufactured. With the add-on version, the pivotally attached fulcrum (swing arm), lanyard for swinging the swing arm into a raised position, the swing arm latch, pivot stop and biasing spring are all readily attachable to a wide variety of makes and models of upright hand trucks without having to alter the engineered structure of the truck in any way. The mounting hardware or components of the add-on version rely on compression, and the straddling of existing structural members of the truck coupled with the compression, again, to eliminate having to alter the existing structure of the hand truck via cutting or welding.

These, as well as other objects and advantages of the invention will become more apparent with continued reading coupled with a review of the included drawings.

BRIEF DESCRIPTION OF THE DRAWINGS

FIG. 5 is a side view of the hand truck of FIG. 3 with the left hand wheel of the truck removed for illustrative purposes, positioned adjacent the vertical face of a curb at the start of the levering process to move the wheels to the upper side of the curb; and, FIG. 6 illustrates the furthering of the process of the hand truck of FIG. 5 being positioned to the upper side of the curb, wherein the wheels are raised relative to the curb on the swing arm; and, FIG. 7 illustrates the wheels of the truck of FIGS. 5 and 6 positioned above the curb, and the swing arm serving as the fulcrum with the truck potentially balanced thereon, depending upon the load distribution; and, FIG. 8 being the further progression of FIG. 7 illustrates the swing arm having began to pivot toward the wheels (stored position) to render the truck moving forward further over the curb and for the wheels to begin moving downward to the upper side or sidewalk of the curb; and, FIG. 9 being the further progression of FIG. 8 illustrates the swing arm having pivoted toward the wheels sufficiently far to set the wheels onto the upper surface.

BEST MODE OF CARRYING OUT THE INVENTION

Figure 1:
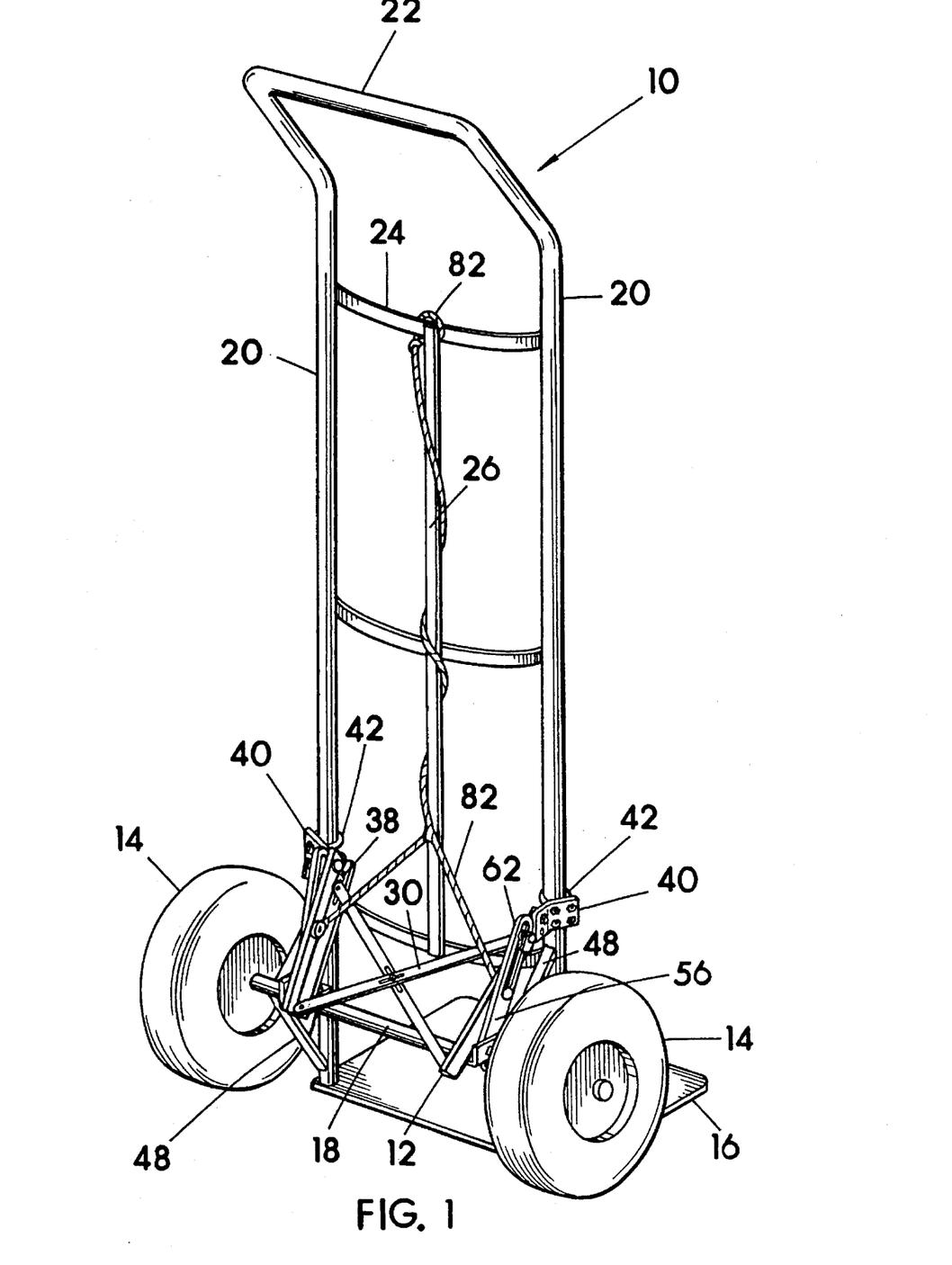
FIG. 1 is a perspective view of the rear or back side an upright hand truck in accordance with the present invention, and showing the swing arm in the stored position with the distal end thereof downward adjacent the rear portion of the cargo platform, and in this example, the swing arm is resting against the wheel axle member. The cargo platform is shown extending generally horizontally outward from the front of the upright hand truck.
Figure 2:
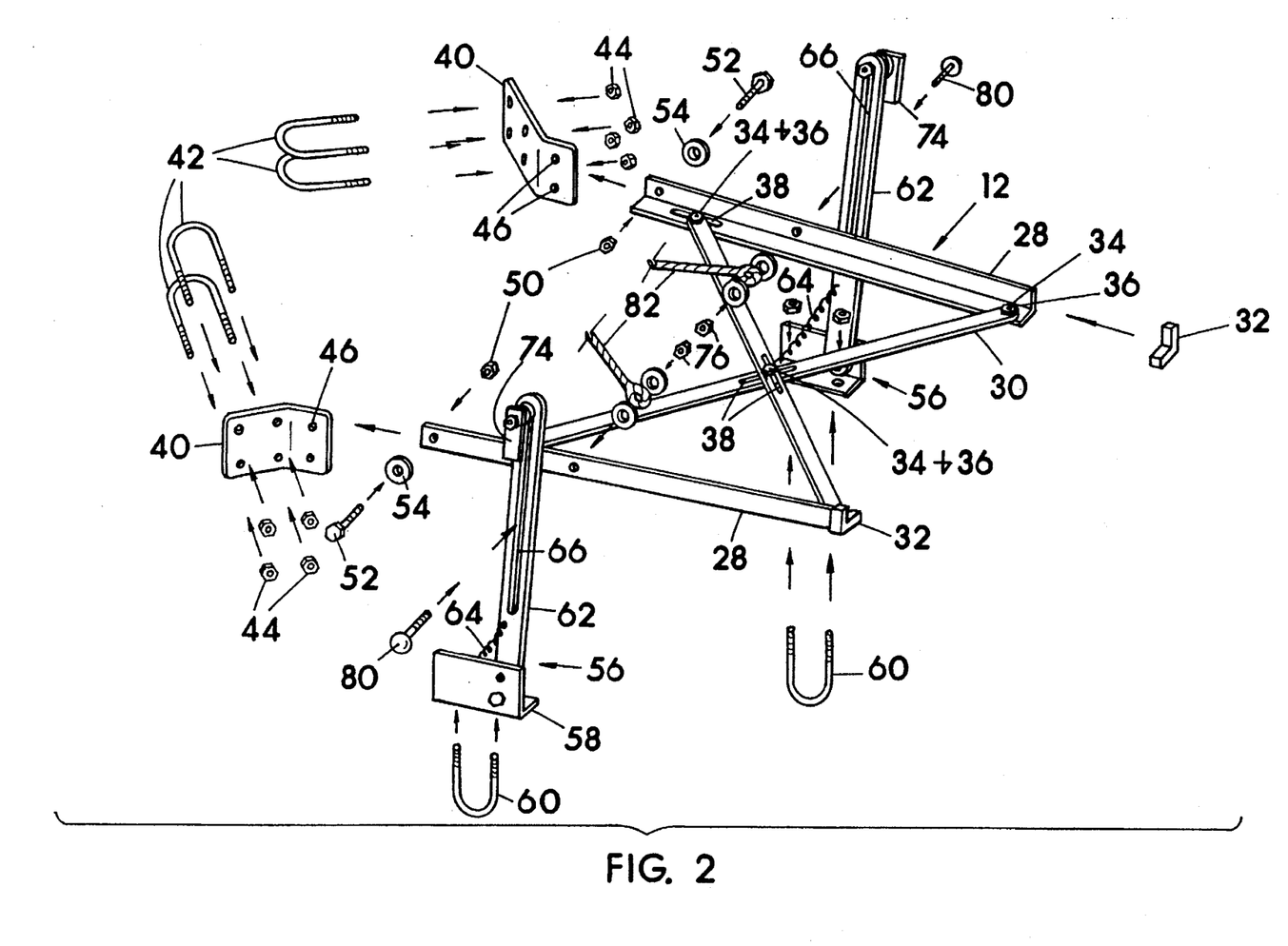
FIG. 2 is a partially exploded view of a pivotal swing arm and attachment and support hardware in accordance with one version of a structural embodiment.
Figure 3:
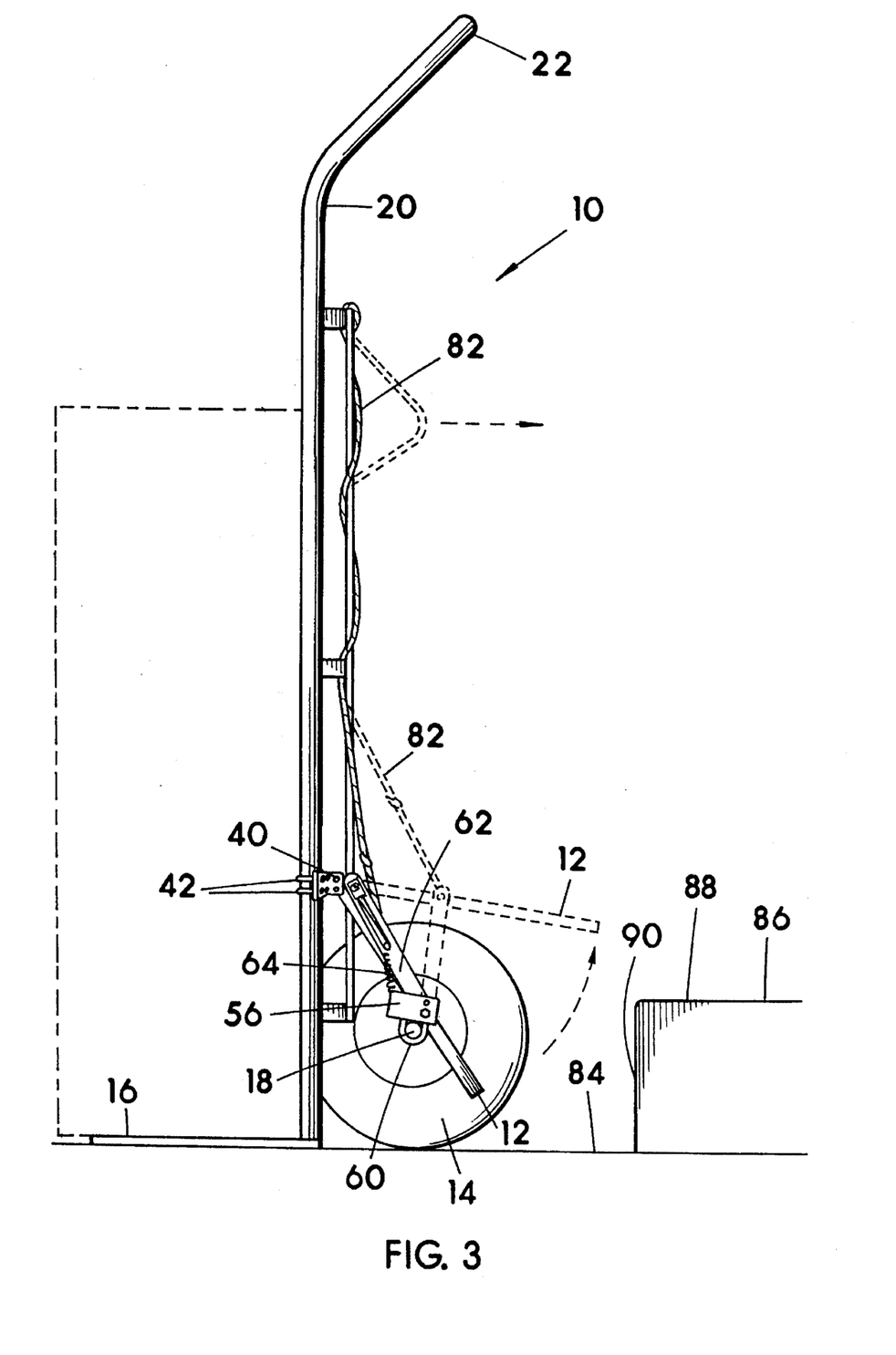
FIG. 3 is a left side view of the upright hand truck, equipped with a swing arm, near a curb with the left hand wheel of the truck removed for illustrative purposes.

With general reference now to FIGS. 1–9, and in particular to FIGS. 1 through 3 wherein an upright hand truck 10 and an example of a pivotal swing arm 12 are illustrated. The upright hand truck 10 generally comprises two rotatable wheels 14 at the bottom end; the wheels 14 being in spaced relationship and on oppositely disposed sides of a cargo platform 16 also at the bottom end. A transverse wheel axle support 18 extends between the centers of the two wheels 14, axle support 18 being positioned behind and slightly higher than cargo platform 16. Cargo platform 16 is located between the wheels 14, and is generally horizontally disposed and resting on the ground when truck 10 is in the full upright or vertical non-moving or resting position as shown in FIGS. 1 and 3. Cargo platform 16 extends outward from the front of truck 10, and the vertical center axis of the wheels 14 is positioned sufficiently rearward of cargo platform 16 so that the wheels 14 do not enter the cargo carrying area. Securely attached to the rearward portion of cargo platform 16, and adjacent wheel axle support 18, are two vertically rising elongated side rails 20, normally between about 4 and 5 feet in length, but can be shorter or longer, which are in spaced relationship and normally parallel to one another. The bottom ends of rails 20 are attached to cargo platform 16. The rails 20 extend upward generally perpendicularly from cargo platform 16, transversely to axle support 18, and include hand grip areas or handles 22 at the upper ends thereof. The two rails 20 are normally tied together with multiple transverse cross members 24 for added strength and rigidity, and cross members 24 are sometimes connected with a center vertical member 26 for further rigidity. Typically, adjacent each wheel 14, an angled brace 48 is attached between the rearward portion of cargo platform 16 or the lower ends of rails 20 and upward to the rails 20 above the axle support 18. The braces 48 normally also attach to the axle support 18.

So the reader may have an idea of scale, in the drawing figures, truck 10 is about 51 inches high overall as measured from the bottom (ground contacting portion) of wheels 14 upward to the handle 22 region, and wheels 14 are 10 inches in diameter. The wheels on most hand truck are about eight 8 or 10 inches in diameter, but can be slightly smaller or larger.

As previously stated, truck 10 could be manufactured with the swing arm (fulcrum) as an integral component thereof, or the swing arm and supporting components could be structured as an attachable structure for clamping onto existing upright hand trucks, using straddling components and compression to eliminate the need to cut structural members of the truck. The following detailed description is of an attachable form of the swing arm 12 and support components therefore which could be readily attached to a variety of existing hand trucks of different makes and models, although it will be readily apparent the general principles would be utilized if the swing arm were manufactured as an integral component of the upright hand truck.

In further reference to FIGS. 1 and 2, but mainly FIG. 2 which is a partially exploded view of a pivotal swing arm 12 and attachment and support hardware in accordance with one version of a structural embodiment, and given for example only, as clearly many changes could be made to that which is shown. Shown in FIG. 2 is swing arm 12 defined by two generally parallel lengths of rigid angle iron, designated sides 28, in spaced relationship and tied to one another by two rigid steel flat bars 30 in a crossing pattern. Optionally, at the bottom (distal) end of the swing arm or sides 28 are rubbery or padded shoes 32 which may be applied to prevent scaring of the tops of curbs and to be a further preventive to slipping of the swing arm 12 against a surface. Flat bars 30 are attached to the swing arm sides 28 using nuts 34, bolts 36, and slots 38 which retain the swing arm 12 in a generally rectangular shape, and when the nuts 34 and bolts 36 are fully tightened, the swing arm 12 is very rigid. However, when the nuts 34 and bolts 36 are loosened, in combination with the multiple slots 38 being properly located and sized in both the center of flat bars 30 and in the upper end of both of the swing arm sides 28, the upper end of the sides 28 may be brought closer together or spread further apart in order for the swing arm 12 to be made to properly fit a variety of rail 20 spacings found on existing trucks made by different manufacturers. Slots 38 are slightly wider than the shanks of bolts 36 and therefore allow sliding of the bolts 36 within the slots 38 and the widening or narrowing of the upper end of swing arm 12 before tightening of all nuts 36 to render the swing arm 12 rigid.

Swing arm 12 is attached to rails 20 via brackets 40 and U-bolts 42 which span the diameter of the rails 20 prior to being secured and tightened in place with nuts 44 applied to the threaded ends of U-bolts 42. The upper end of swing arm 12 is connected to both rails 20 via each upper end of sides 28 being pivotally connected to a bracket 40, one side 28 per bracket 40. Each bracket 40 is rigidly attached to a rail 20, one bracket 40 per rail 20 via a U-bolt 42 applied around the rail 20 and the threaded ends of the U-bolt 42 inserted through spaced holes in the bracket 40 followed by the applications of nuts 44. Two U-bolts 42 per each bracket 40 are illustrated and will provide better holding pressure via increased compression and surface area contact compared to the use of a single U-bolt 42, which would function under most conditions. Brackets 40 are each rectangular, somewhat elongated strong rigid plates, made of steel for example, each having two holes for each U-bolt 42, or possibly one elongated slot for each U-bolt 42 which might provide greater adjustability in positioning. Each bracket 40 preferably includes a bend or angular portion having at least one hole 46, and preferably two holes 46 therethrough to allow the pivotal attachment of the upper end of one of the sides 28 of swing arm 12. The angular change toward the one end of the brackets 40 allows for one portion of the bracket 40 to be secured against the rail 20 at a first angle, and the second angular portion to be connected to the swing arm 12 in a manner wherein the loading applied to the connection through the swing arm during fulcrum use is about centered toward the rail 20 and thereby reduces the rotational forces and the tendency for slipping of brackets 40 and U-bolts 42 around the rail 20 under heavy loading. Additionally, the angle of the portion of bracket 40 when properly installed will more readily accommodate the slight angular approach of the sides 28 of the swing arm 12 when the sides 28 are in a relatively spread condition to accommodate a rather wide spread between rails 20. As shown in FIG. 2, the end portion of the brackets 40 include two holes 46, one vertically above the other for the pivotal attachment of the swing arm 12, and although only one hole 46 per bracket 40 is used at a time to make the pivotal attachment, the swing arm 12 may be connected to either the lower or the upper holes 46, and this selection would be based on whether the brackets 40 were position higher or lower relative to truck braces 48 as shown in FIG. 1. Depending on the specific location of the braces 48, and they vary widely from one truck to another, the bracket 40 may need to be raised or lowered in its attachment to the rails 20, and this raising or lowering will effect the use position of the swing arm 12, i.e, vertical position and angular outward raised position, and the upper or lower holes 46 may be used to make adjustments, along with other adjustable features which will be detailed.

The pivotal attachment of the swing arm 12 to the brackets 40 may be accomplished through any suitable arrangements which are sufficiently strong and allow free pivoting, and in the example of FIG. 2, nuts 50, washers 54 and bolts 52 are used in conjunction with aligned holes in sides 28 and bracket 40 wherein the connection is secure and pivotal, yet the nuts 50 are not tightened to a point to prevent pivotal movement of arm 12. Nuts 50 may be plastic filled or otherwise made so that cannot back-off of the bolt threads, or doubled nuts may be used to prevent the connection from vibrating apart. Pins, washers and cotter pins or C-clips could also be used to make pivotal connections.

Also shown in FIGS. 1, 2 and 3, are two hinge-like structures designated hinges 56. Hinges 56 in this example provide multiple functions, serving to limited outward or raised movement of swing arm 12 to a predetermined maximum, and also serving to bring swing arm 12 fully into the stored position and to hold the arm in the stored position, holding it from swinging freely during normal cargo transporting use of the truck 10.

Figure 2A:
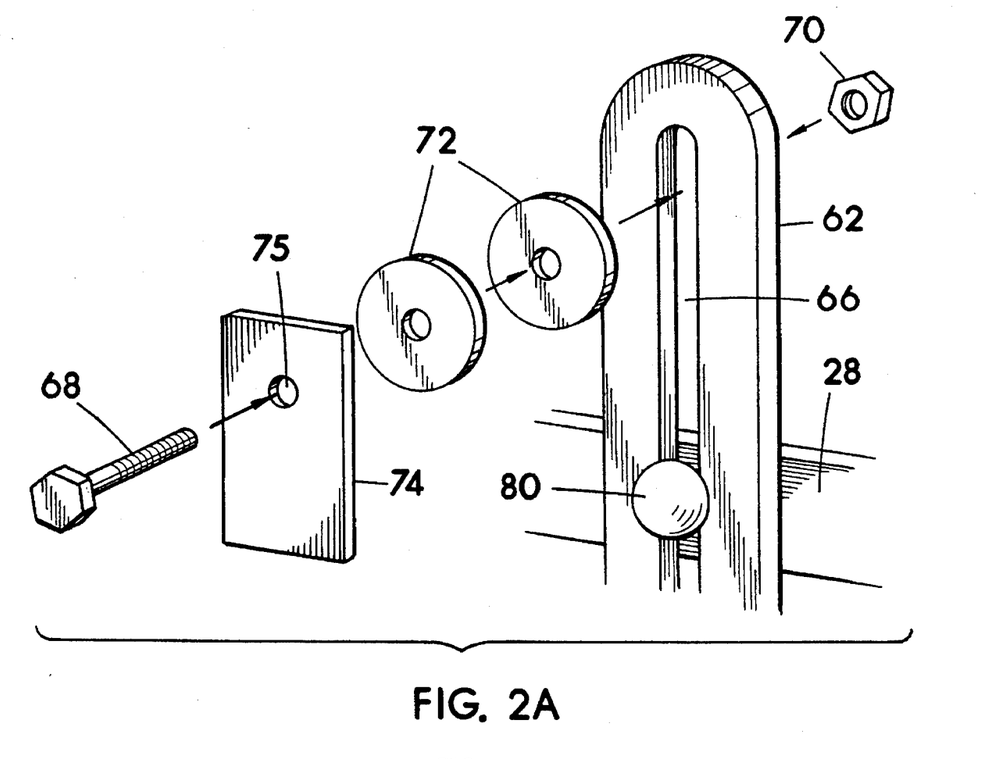
FIG. 2A is a partially exploded perspective view of a latch arrangement connectable on an upper end of a slotted stop strap useful to limit pivotal movement of the distal end of the swing arm toward the handle end of the rails.
Figure 2B:
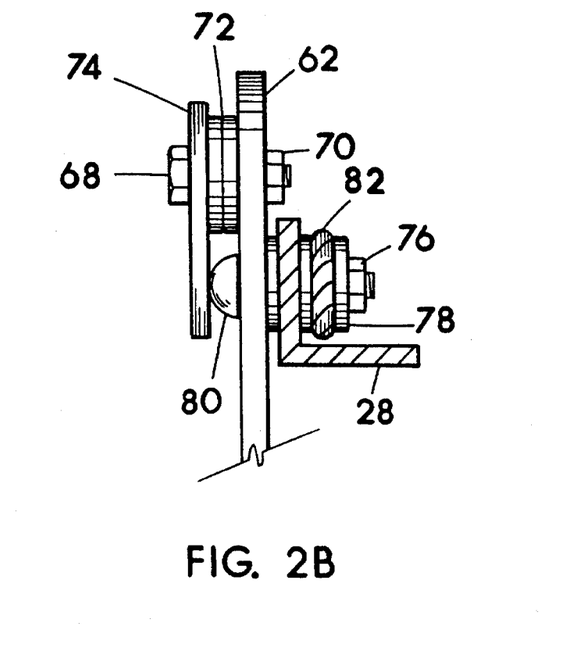
FIG. 2B is a side view of the upper end of the slotted strap of FIG. 2A with the latch components assembled and in the latched or engaged position.

Each hinge 56 generally comprises a rigid L-bracket 58, made of a short length of angle iron for example, with the L-bracket 58 having two spaced holes to allow attachment thereof utilizing a U-bolt 60 straddling the axle support 18 with L-bracket 58 positioned transversely to the length of axle support 18. One U-bolt 60 per L-bracket 58 will normally be adequate. The use of U-bolts 60 in the attachment of L-brackets 58 generally allows the placement of the bracket 60 anywhere along the normally round tubular axle support 18, and this allows easy alignment thereof directly underneath sides 28 of swing arm 12. Each L-bracket 58 further includes an elongated rigid strap, designated stop strap 62. One end, the bottom end of stop strap 62 is pivotally attached to the vertical portion of L-bracket 58 using any suitable pivotal connection such as a nut and bolt as described above for the pivotal attachment of swing arm 12. Connected between stop strap 62 and L-bracket 58 is an extension spring 64 sufficiently short and strong, and properly placed to bias stop strap 62 toward lying angled to L-bracket 58 or with the top end of strap 62 aiming toward the truck rail 20 as may be seen in FIG. 1, which has the effect of lightly holding the swing arm 12 abutted against the axle support 18 when in the stored position. Most of the upper length of stop strap 62 includes a lengthwise positioned central slot 66 which extends up to but not through the top end on the strap 62. As shown best in FIGS. 2, 2A and 2B, a first portion of a latch mechanism is attached to stop strap 62 via a bolt 68 inserted through slot 66. Bolt 68 is secured in slot 66 via a nut 70 applied to the threaded end of the bolt 68. As shown in FIGS. 2A and 2B, positioned over the shank of bolt 68 are washers 72 which serve as spacers to stand-off a generally rigid latch plate 74 having a hole 75 and also applied over the shank of bolt 68. Latch plate 74 is suspended over slot 66. FIG. 2B shows the assembled components wherein the head of bolt 68 is abutted against latch plate 74 which in turn is abutted against washers 72 which are maintaining latch plate 74 a short distance off of stop strap 62. The washers 72 are abutted against the side of stop strap 62, and the threaded end of bolt 68 passes through slot 66 and nut 70 is applied to secure the assembly in place on the stop strap 62. The bolt 68 and thus latch plate 74 may be positioned any place along the length of slot 66 via loosening nut 70 and sliding bolt 68 in slot 66. Once the bolt 68 and thus latch plate 74 is located as desired, nut 70 is securely tightened in order to prevent sliding of the bolt 68 along slot 66. Each stop strap 62 is attached to one side 28 of the swing arm outward about ½ or ⅓ away from the top end toward the distal end of the swing arm using pivotal attachments such as nuts 76, washers 78 and bolts 80. The pivotal connection is made via passing the shank a smooth headed bolt 80 such as a carriage bolt through a hole in each side 28 and into the slot 66 with the pivotal connection secured with a nut 76, yet loose, leaving stop strap 62 able to slide up and down relative to side 28 via slot 66 traveling over the shank of bolt 80. The round head of the carriage bolts 80 are positioned facing toward the back side of latch plate 74 so that when swing arm 12 is raised, such as by pulling on lanyard 82, arm 12 with bolts 80 move upward relative to stop strap 62 bringing or jamming the head of carriage bolt 80 up and underneath an extending portion of latch plate 74 wherein frictional engagement occurs and the swing arm 12 is retained or latched upward. The frictional engagement is just adequate to hold the swing arm 12 upward, and is easily overridden with downward pressure applied to the swing arm 12 in the direction of pushing the arm 12 toward the stored position with the distal end of the arm 12 resting near or adjacent the rearward portion of the cargo platform 16. Additionally, bolt 68 and the adjacent spacer washers 721thereon provide a positive stop against which carriage bolt 80 cannot pass, and therefore the raising of swing arm 12 is limited, and the limit to the degree of which swing arm 12 may be raised into an angular rearward extension away from rails 20 is adjustable via the adjustability of bolt 68 in slot 66. Since the bolt 68 is selectively positionable along the length of slot 66, the degree to which swing arm 12 can be raised may be chosen or adjusted, and this further allows application to a variety of existing upright hand trucks. This limits the movement of the distal end of swing arm 12 toward the handle area 22 of the rails 20 to a predetermine position, and this is important during the leveraging of the truck 10 up and onto the top of the raised surface. Also, when swing arm 12 is in the raised position, stop straps 62 are preferably at a 90 degree angle to sides 28 for loading purposes, i.e., pulling tension against L-bracket 58 during curb climbing with swing arm 12 so as to reduce rotational forces. As shown in FIG. 2B, bolt 80 may be made sufficiently long to allow the tying or affixing of a lanyard 82 thereto, and in FIG. 1 it can be seen the lanyard 82 is of a Y configuration at the lower end so that each end of the Y is attached to a bolt 80 for even pulling on the swing arm 12 to draw it into the raised position. The upper end on the lanyard 82 is shown tied or otherwise affixed upward toward the handled area 22 so the operator may conveniently raise the swing arm 12 without having to bend over. Lanyard 82 in this example is a flexible cord such as a small rope.

Figure 4:
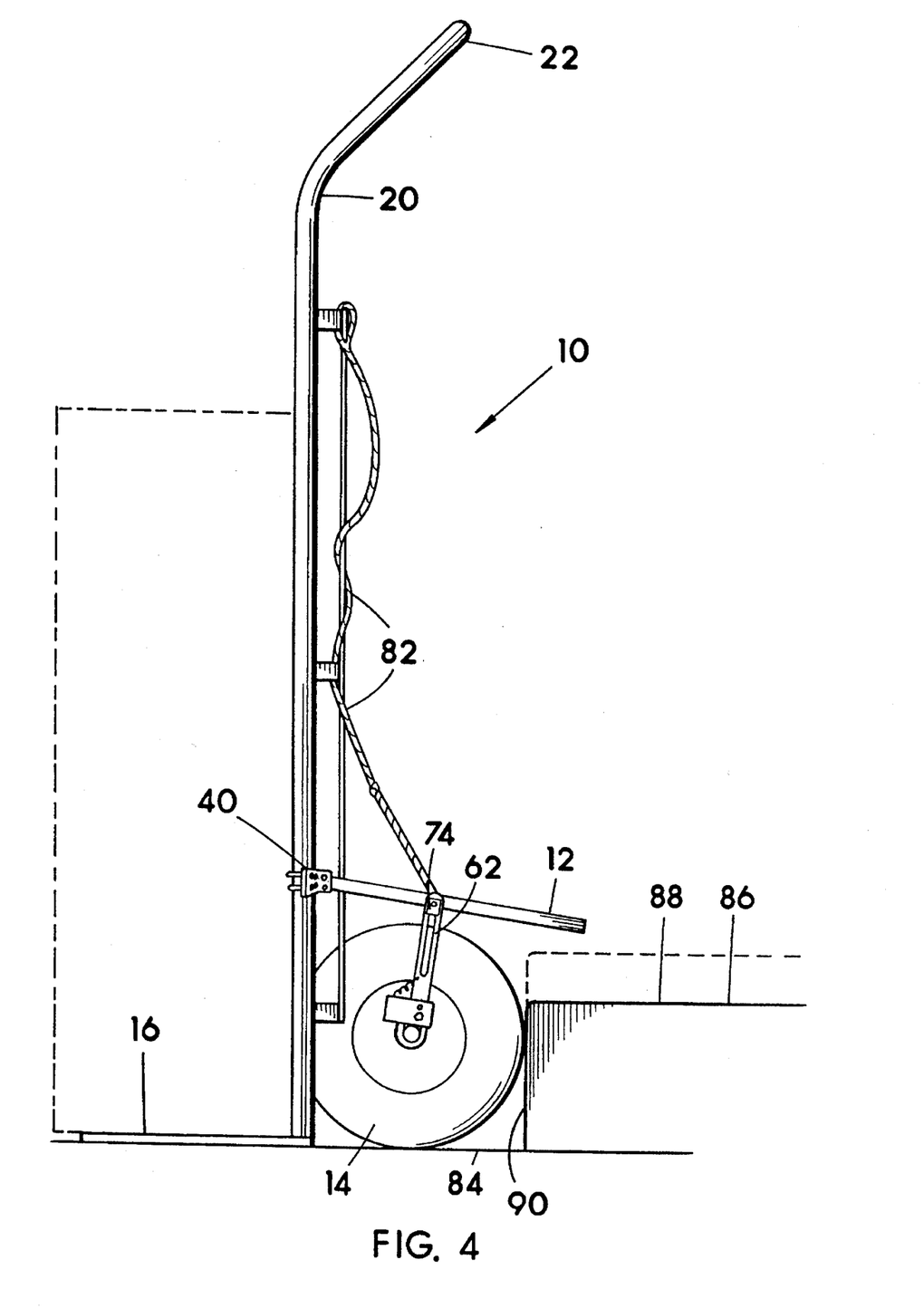
FIG. 4 is a left side view of the FIG. 3 upright hand truck abutted the curb with the left hand wheel of the truck removed for illustrative purposes. The rear side of the truck is shown facing the curb and the adjacent raised surface.
Figures 5, 6:
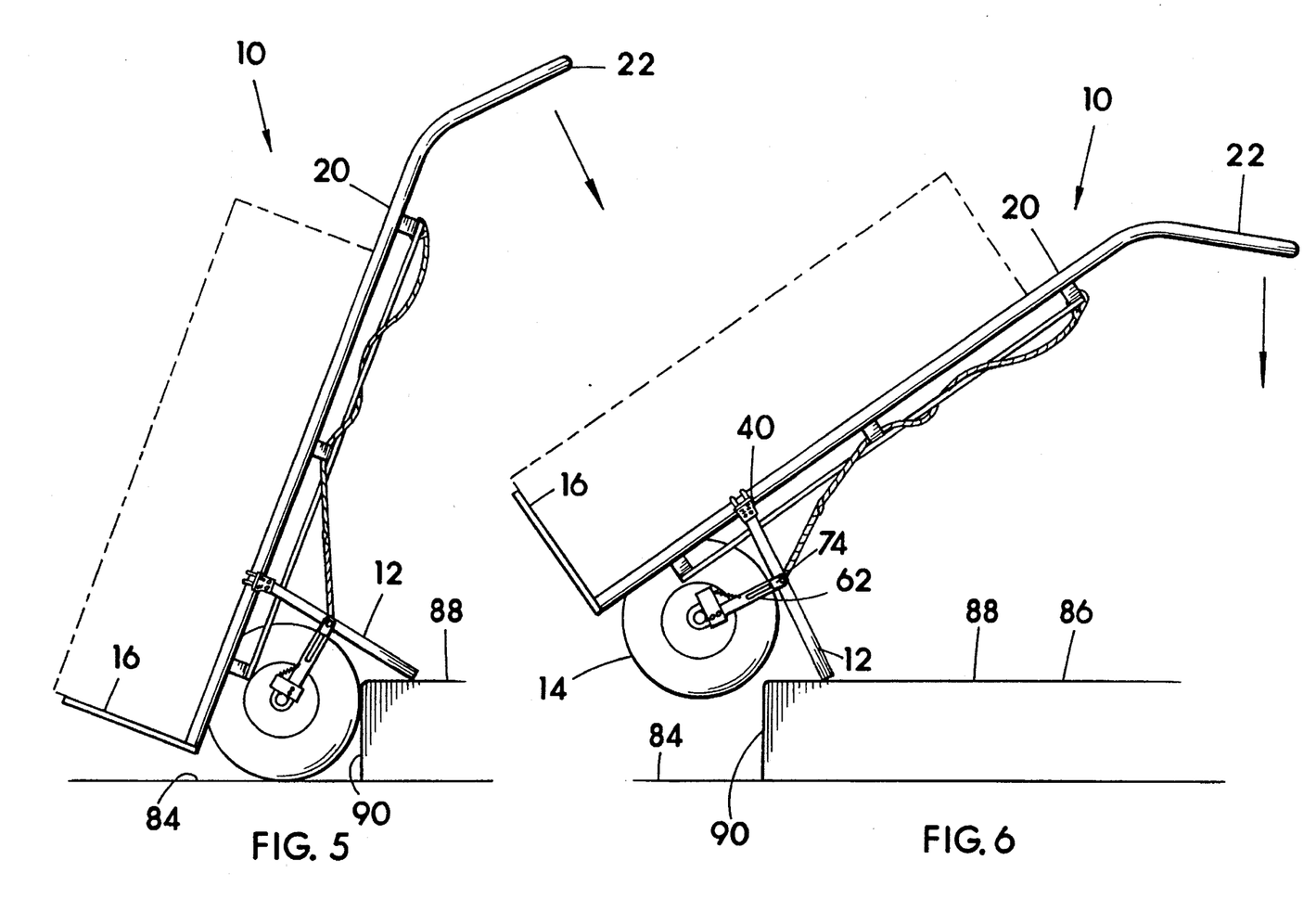
Figure 7:
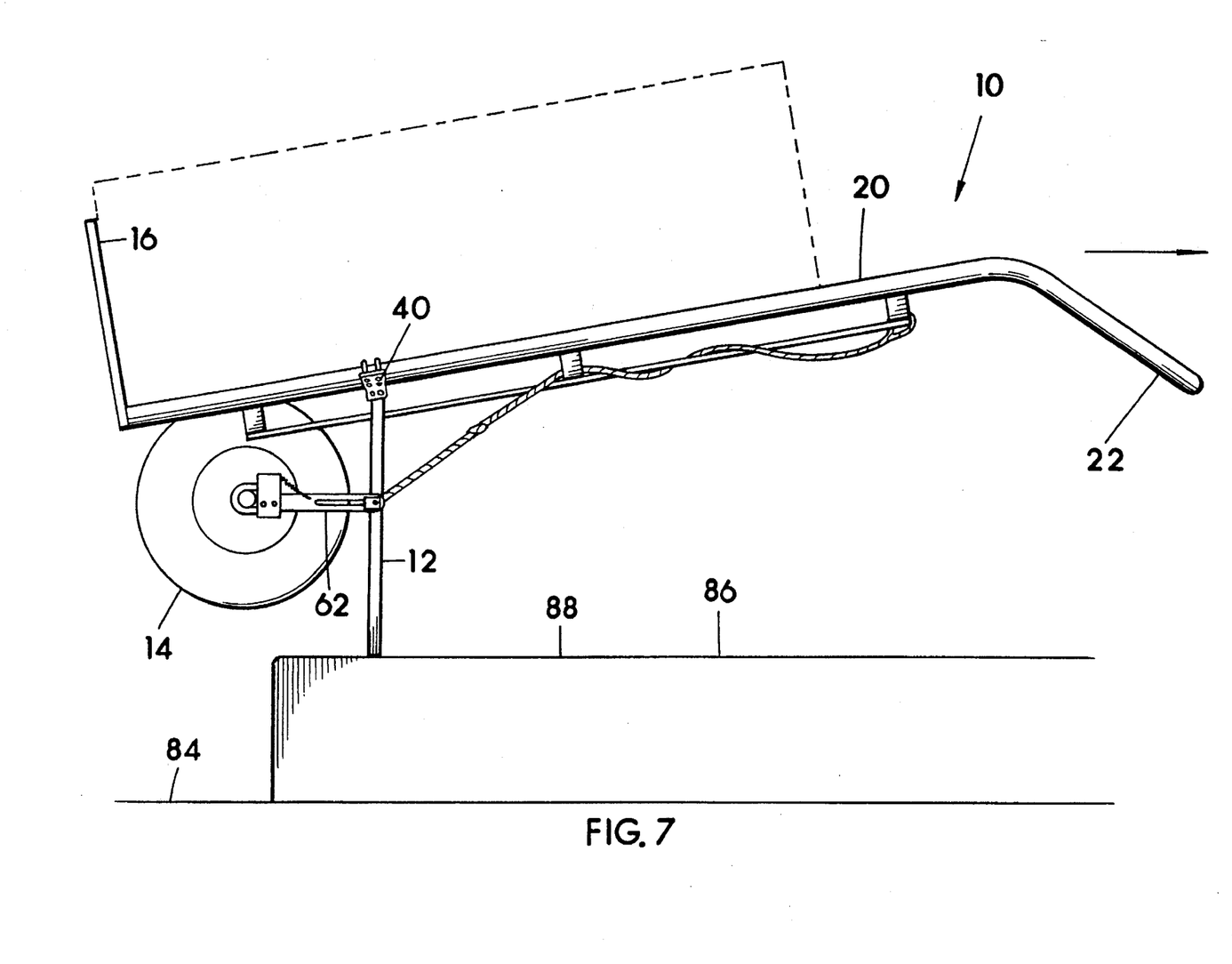
Figure 8:
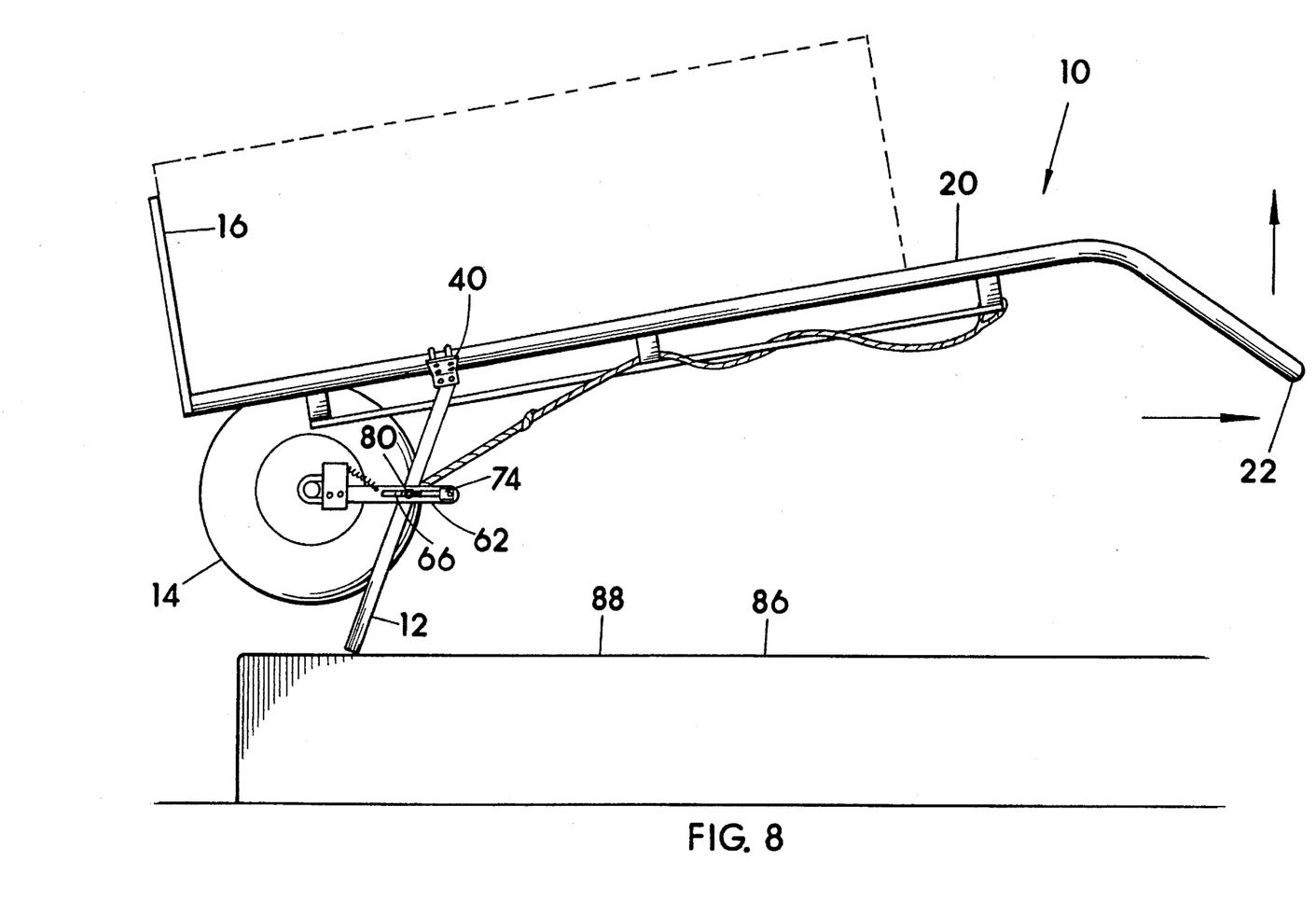
Figure 9:
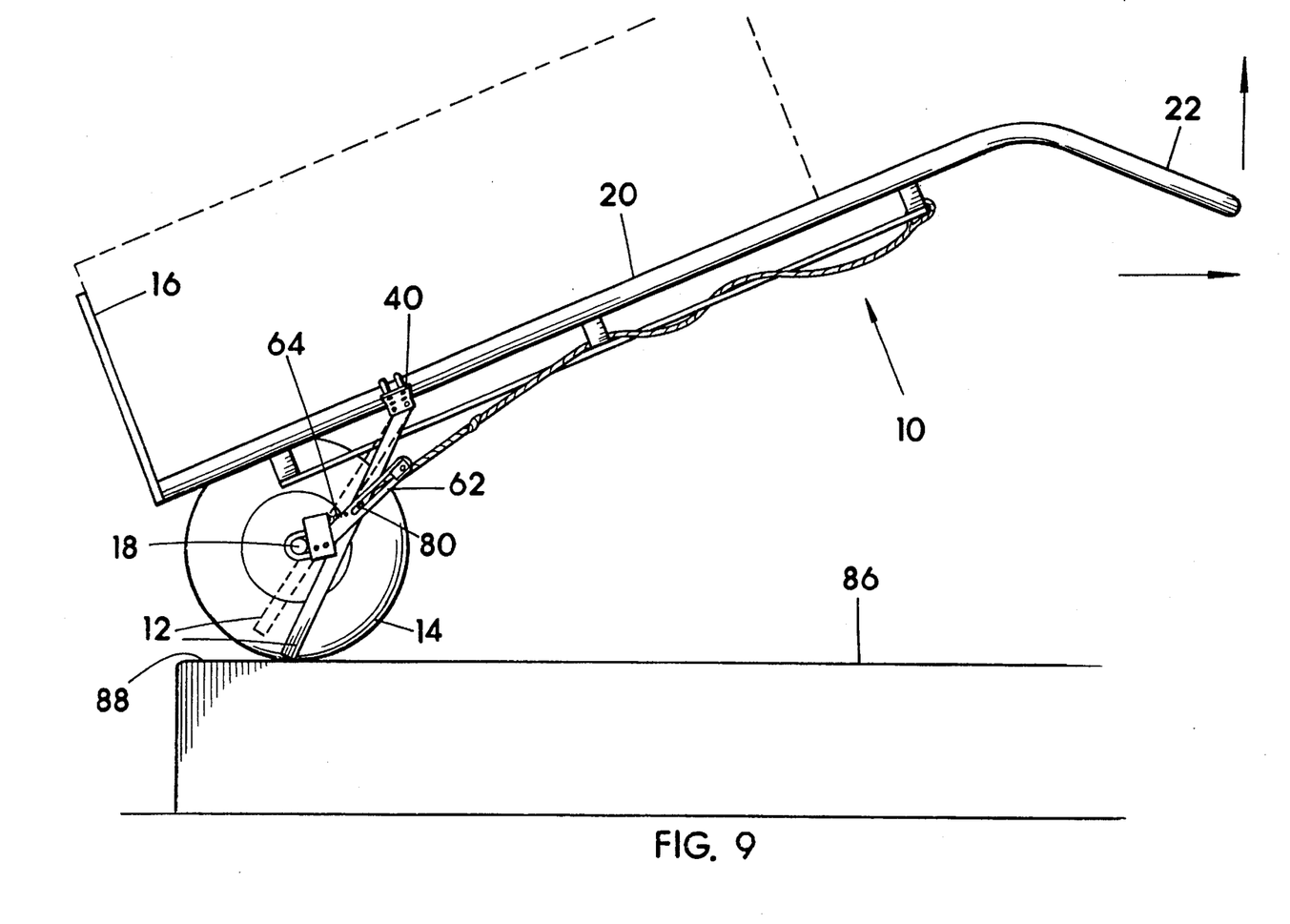

As previously stated, the pivotal connection of swing arm 12 to truck 10 and specifically rails 20 is quite low, and this is allowed due to the use of the top of the raised surface 86 as a further extension of the swing arm 12 (fulcrum), and this low placement is very desirable in that the lower the swing arm 12 in its attachment to rails 20, the greater the length of rails 20 upward above the pivotal attachment to serve as levers. The longer the levers the greater the gain for the operator in maneuvering the truck 10 up from a lower surface to a higher adjacent surface. With a truck normally having an overall height of 4 to 5 feet from the bottom of the wheels up to the handle region, and further taking into account normal curb heights being between 6 and 7 inches, and further expecting a 9 inch maximum height curb as indicated in FIG. 4 in dotted lines, the pivotal attachment is placed at about 12 inches vertically up rails 20. This 12 inch up placement positions the pivots above normal curb height and maximum curb height, and the pivots are still less than 30% vertical up relative to the overall height of the truck and leaving more than two-thirds of the length of the rails above the pivot to serve as levers. Ideally, as shown in FIG. 4, when the swing arm 12 is latched in the outward raised position, and limited from moving any substantial distance further upward toward handles 22, the swing arm is positioned at a slight downward slope, being about but slightly less than perpendicular to the rails. This slightly less than 90 degrees to the rails 20 will predispose the swing arm 20 toward pivoting into a stored position when the truck wheels have been raised above the top of the curb. Although the swing arm could be locked at 90 degrees to the rails, or even possibly at a slight lean toward the handles 22, which is about perpendicular to the rails 20, and still function, it would not function as well. I prefer the downward sloped angle between rails 20 and the swing arm sides 28 to be between about 75 and 85 degrees as indicated in FIG. 4 where the underside angle is about 80 degrees. Also, as may be ascertained from FIGS. 3 and 4, the length of out extension of swing arm 12 away from rails 20 is important, in that if it extends outward too far in length then it will not be stored with the distal end thereof sufficiently inward of the wheel 14 radius and provide ground clearance for normal tilted rolling use of the truck, and as may be ascertained, if swing arms 12 extends outward too far at its preferred slight downward angle, then the distal end thereof will hit the top corner or vertical face 90 of the curb. If the swing arm 12 is of a length less than the vertical height upward of the pivotal attachment, then the swing arm 12 will store inward of the outward or major diameter of the wheels, and normal rolling use of the truck is allowed. For example, if the swing arm 12 is attached 12 inches vertically upward from the bottom of the wheels 14, then a swing arm of about 11 ½ inches in length will function as desired. It should be noted that in the final rearward approach of the truck 10 toward the curb 88, the truck 10 is tilted rearward slightly in order to raise cargo platform off of the ground and allow rolling, and this has the effect of lowering the distal end of swing arm 12, the degree of which being determined by the degree of tilt of the truck, and the swing arm 12 must be in the raised position at that time, and in FIG. 4 where the 9 inch curb is indicated with dotted lines, it can be seen that it would be a close fit of the swing arm over the curb if the truck were tilted, but that the distal end of the swing arm 12 would clear the curb top even with the truck 10 at the slight tilt. And so the swing arm 12 cannot be too long. Swing arm 12 cannot be too short either. For example, if the swing arm is too short, say, ½ the length of that shown in FIG. 5, then clearly prior to the wheels 14 being raised above the top surface of the curb, since the handle would have began very close to the raised surface, the handle 22 would abut the top surface 88 and prevent further raising of the wheels, resulting in the inability to move the truck onto the raised surface. Therefore, dependant upon such factors as curb height and length of the storable swing arm 12, and assuming the pivotal attachment of the arm 12 is made in the lower 30% of the overall normal truck height, rails 20 will usually be lying between 90 degrees and 35 degrees to a horizontal plane of the raised surface 86, and preferably leaning slightly over the top of the curb when the wheels 14 are on the lower surface 84 with the wheels 14 abutted against the face 90 of the curb when the distal end of the swing arm 12 has just abutted the top of the raised surface 86, as may be ascertained from FIG. 5. It should be noted that some upright hand trucks have skids or bars extending slightly beyond the rearward edge of the wheels, and the wheel in this case will not be the portion of the truck which will abut the face 90 of the curb, but the skids or bars will be the face 90 abutting portion of the truck.

Again, this description will be in relationship to a 9 inch maximum height curb example, since normally this will be the highest curb expected to be encountered. The shown curb 88 is about 6 ½ inches high in the drawings, with this being an average height of curb, and in FIG. 4 a dotted line is shown above the curb 88 to illustrate the height of a 9 inch curb. Truck 10 is 51 inches in overall height, and has 10 inch wheels 14, and is drawn to approximate scale relative to the curb 88 height. In reference now primarily to FIGS. 3 through 9, in use, if the truck is approaching the curb 88 with cargo platform 16 first, then the truck 10 needs to be turned around to have the rear of the truck 10 facing the curb 88. Truck 10 is backed up and placed with the wheels 14 or lower portion of the truck on the lower surface 84 adjacent the curb 88, and cargo platform 16 extending away from the curb 88. The swing arm 12 needs to have been raised and latched prior to the truck 10 being positioned too close to the vertical face 90 of the curb 88. The truck 10 should be positioned square to the curb, and is properly aligned when both wheels 14 (or skids) are abutting or are very close to the face 90 of the curb, which is a generally error proof alignment system. Then the rails 20 are pulled rearward and downward, via manually grasping and pulling in handle area 22, in an arched swing over the raised or upper surface 86 by the operator, causing the distal end of the swing arm 12 to abut the top of the upper surface 86 or curb 88, and then with further pulling of the rails 20 causing the wheels 14 and cargo platform 16 to raise above the top of the curb or upper surface as the truck 10 is pivoted on the extended swing arm 12 serving as the fulcrum. Partially through the curb climbing procedure, after the wheels 14 are raised above the curb 88, the latch plate 74 abutting the head of bolt 80 automatically disengages or is over ridden by way of the weight (pressure) of the cargo being repositioned relative to the swing arm 12 (fulcrum) due to the further downward movement and thus angular changes in the rails 20 as the result of the operator continuing to pull downward on the handles 22 of the rails 20. As the weight is redistributed relative to the swing arm 12, the swing arm 12 begins pivoting toward a stored position adjacent the wheel axle 18 and rear portion of the cargo platform 16, under the redistributing weight, which has the result of moving the truck 10 horizontally further over the raised surface 86 as the wheels 14 are gently lowered to rest on the top of the raised surface 86. The operator is essentially required to only pull rearward and then mostly downward on the handles 22, which is essentially one sweeping motion, and the angular changes in the rails 12 cause a redistribution of the weight relative to the swing arm 12, the degree of which is dependant upon the particular load on the cargo platform 16, which has the effect of causing the load itself to begin working for the operator in completing the forward horizontal movement of the truck 10 further over the raised surface 86 as the swing arm 12 pivots toward the wheels 14 and lowers the wheels 14 onto the raised surface 86. Once the wheels 14 are above the top of the raised surface 86, in order to expedite the pivoting of the swing arm 12 toward the stored position and eliminate the need for further downward movement of the rails 20, the operator may, if he chooses, and if the weight of the load permits, pull horizontally on the handle 22 to give impetus to the pivoting of the swing arm 12 into the stored position. In either situation, the operator causes and easily controls the lowering of the truck wheels 14 onto the raised surface 86 via his control over continued downward movement of the rails 20 and the resultant angular changes and weight redistribution between the pivotal swing arm 12 and the truck rails 20, or via his pulling horizontally on handles 22 once the wheels 14 are sufficiently raised to cause pivoting of or give impetus to the swing arm 12 and the lowering of the wheels 14 onto the raised surface 86. Once the wheels 14 are resting on the top of the raised surface 86, the swing arm 12 is drawn further upward into the stored position by springs 64 drawing on stop straps 62 which has the effect of causing bolts 80 to slide downward in slot 66 drawing swing arm 12 and stop strap 66 into approximate coextensive alignment with the swing arm 12 in the stored position having the distal end thereof essentially adjacent the rear portion of the cargo platform 16 and above the ground during normal tilted rolling use of truck 10.

Although I have very specifically described the preferred structures and use of the invention, it should be understood that some changes in the specifics described and shown in my drawings may clearly be made without departing from the true scope of the invention in accordance with the appended claims.

What I claim as my invention is:

1. A manually operable upright hand truck having pivotal fulcrum means for assisting in maneuvering said truck rearward and upward from a lower surface onto an adjacent raised surface, said truck including two rotatable wheels at a bottom end of the truck, the wheels being in spaced relationship to one another and on oppositely disposed sides of a cargo platform also at the bottom end of the truck, the cargo platform generally horizontally disposed and resting on the ground when the truck is in a vertical resting position, the cargo platform extending outward from a front side of the truck, and a vertical center axis of the wheels positioned sufficiently rearward of the cargo platform so that the wheels are rearward of a cargo carrying area of the cargo platform, two vertically rising elongated rails attached at bottom ends of the rails to a rearward portion of the cargo platform, the rails being in spaced relationship to one another, upper ends of the rails including a hand grip area, an overall height of said truck defined by a distance between a bottom of said wheels upward to said hand grip area when said truck is in said vertical resting position, said pivotal fulcrum means for assisting in maneuvering said truck rearward and upward from a lower surface onto an adjacent raised surface comprising an elongated arm pivotally attached to said rails, the pivotal attachment of said arm to said rails being upward from said bottom of said wheels less than 30% of said overall height so as to leave a substantial length of said rails above the pivotal attachment of said arm, the pivotal attachment of said arm to said rails being upward above said cargo platform with said truck in said vertical resting position, said arm providing a pivotal fulcrum upon which to raise said truck upward with said rails serving as levers in conjunction with said arm, said arm being pivotally positionable into a stored position wherein a distal end of said arm is downward below the pivotal attachment to the rails and adjacent said wheels, said arm further being pivotally positionable into a raised predetermined outward position wherein said arm is extending outward from a rear side of said truck, limit means in communication with said arm for limiting said arm to a said outward position so as to limit pivotal movement of said distal end of said arm toward said hand grip area, releasable latch means including a latch in communication with said arm for temporarily maintaining said arm in said outward position while positioning said truck for moving from the lower surface to the raised surface, said releasable latch means being disengagable for allowing said arm to pivot toward and into said stored position, said arm being of sufficient length that with said wheels on the lower surface adjacent a transition between the lower surface and the raised surface, and with said cargo platform extending outward away from said raised surface simultaneously with said arm in said outward position, said arm extends sufficiently for abutting the top of the raised surface with said distal end simultaneously with said rails lying between 90 degrees and 35 degrees to a horizontal plane of said raised surface, said arm further being of sufficient length to allow tilting of said rails pivotally on the arm abutting the raised surface sufficiently downward toward the raised surface to raise said wheels and said cargo platform to a height above the top of the raised surface and to cause disengaging of said latch means and pivotal movement of said arm toward said stored position and the lowering of said wheels onto the raised surface.

2. A manually operable upright hand truck having pivotal fulcrum means affixed thereto for assisting in maneuvering said truck rearward and upward from a lower surface onto an adjacent raised surface, said truck including two rotatable wheels at a bottom end of the truck, the wheels being in spaced relationship to one another and on oppositely disposed sides of a cargo platform also at the bottom end of the truck, the cargo platform generally horizontally disposed and resting on the ground when the truck is in a vertical resting position, the cargo platform extending outward from a front side of the truck, and a vertical center axis of the wheels positioned sufficiently rearward of the cargo platform so that the wheels are rearward of a cargo carrying area of the cargo platform, two vertically rising elongated rails attached at bottom ends of the rails to a rearward portion of the cargo platform, the rails being in spaced relationship to one another, upper ends of the rails including a hand grip area, said pivotal fulcrum means for assisting in maneuvering said truck rearward and upward from a lower surface onto an adjacent raised surface comprising a swing arm pivotally attached to said rails above the cargo platform and near a top of said wheels so as to leave a substantial length of said rails above the pivotal connection of said swing arm, said swing arm providing a pivotal fulcrum upon which to raise said truck upward above a top of the raised surface with the truck tilted rearward over the raised surface, and with said rails serving as levers in conjunction with said swing arm, said swing arm being pivotally positionable into a stored position wherein a distal end of said swing arm is downward below the pivotal attachment to the rails and adjacent said rearward portion of said cargo platform between said wheels, said distal end of swing arm when in said stored position being inward of said wheels so as to provide ground clearance and allow tilted rolling use of said truck for transporting cargo, said swing arm further being pivotally positionable into a raised predetermined outward position wherein said swing arm is extending outward about perpendicular to said rails from a rear side of said truck and in a generally opposite direction from said cargo platform, limit means in communication with said swing arm for limiting said swing arm to said outward position so as to limit pivotal movement of said swing arm toward said hand grip area, latch means in communication with said swing arm for temporarily maintaining said swing arm in said outward position while positioning said truck for moving from the lower surface to the raised surface, said latch means including automatic delatching means for releasing said swing arm upon overriding pressure applied to said swing arm in the direction of pushing said swing arm toward said stored position for allowing said swing arm to pivot into said stored position after said truck has been raised above the top of the raised surface, said swing arm being of sufficient length that with said wheels on the lower surface adjacent a transition between the lower surface and the raised surface, and with said cargo platform extending outward away from said raised surface simultaneously with said swing arm in said outward position, said swing arm extends sufficiently for abutting the top of the raised surface with said distal end simultaneously with said rails tilted over the top of the raised surface, said swing arm further being of sufficient length to allow pivotal tilting of said rails on the swing arm abutting the raised surface sufficiently downward toward the raised surface to raise said wheels and said cargo platform to a height above the top of the raised surface and to cause delatching of said latch means and pivotal movement of said swing arm toward said stored position and the lowering of said wheels onto the raised surface.

* * * * *